US012753322B2

(12) United States Patent
Tanna et al.

(10) Patent No.: US 12,753,322 B2
(45) Date of Patent: Oct. 6, 2026

(54) POWDER COATING WITH SPARKLE EFFECT

(71) Applicant: PPG Industries Ohio, Inc., Cleveland, OH (US)

(72) Inventors: Vijesh Anant Tanna, Pittsburgh, PA (US); Hyun Wook Ro, Gibsonia, PA (US); Vincent Salvatore Pagnotti, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 206 days.

(21) Appl. No.: 18/403,809

(22) Filed: Jan. 4, 2024

(65) Prior Publication Data

US 2024/0228818 A1 Jul. 11, 2024

(51) Int. Cl.
*C09D 133/10* (2006.01)
*C09D 5/03* (2006.01)
*C09D 7/41* (2018.01)

(52) U.S. Cl.
CPC .......... *C09D 133/10* (2013.01); *C09D 5/032* (2013.01); *C09D 7/41* (2018.01)

(58) Field of Classification Search
None
See application file for complete search history.

(56) References Cited

U.S. PATENT DOCUMENTS

| | | | | |
|---|---|---|---|---|
| 3,843,571 | A * | 10/1974 | Fitzgerald ............ | C09D 133/10 524/561 |
| 5,741,602 | A | 4/1998 | Hoppe et al. | |
| 5,830,975 | A | 11/1998 | Perraud et al. | |
| 6,770,694 | B2 | 8/2004 | Ohnishi et al. | |
| 7,034,075 | B1 | 4/2006 | Torborg et al. | |
| 7,547,739 | B2 | 6/2009 | Frese et al. | |
| 10,731,039 | B2 | 8/2020 | Lutz et al. | |
| 2008/0022899 | A1 | 1/2008 | Tsuji et al. | |
| 2015/0361297 | A1 | 12/2015 | Mikami et al. | |
| 2021/0040329 | A1 | 2/2021 | Decker | |
| 2021/0229130 | A1 | 7/2021 | Tomizawa et al. | |

FOREIGN PATENT DOCUMENTS

| | | | |
|---|---|---|---|
| EP | 3792317 | A1 | 3/2021 |
| WO | 89/006674 | A1 | 7/1989 |
| WO | 03/027192 | A1 | 4/2003 |
| WO | 2016/179102 | A1 | 11/2016 |
| WO | 2020/089132 | A1 | 5/2020 |

* cited by examiner

*Primary Examiner* — Michael P. Rodriguez

(57) ABSTRACT

Powder coating compositions are disclosed. Articles coated with the powder coatings may be formed by contacting a least a portion of a substrate with the coating composition and curing the composition to form a coating layer. The compositions may provide a sparkle effect, while being substantially free of effect pigments.

8 Claims, No Drawings

POWDER COATING WITH SPARKLE EFFECT

CROSS-REFERENCE TO RELATED APPLICATIONS

This application claims the benefit under 35 U.S.C. § 119(e) of U.S. Provisional Application No. 63/478,549 filed on Jan. 5, 2023, which is incorporated by reference in its entirety.

FIELD

The present disclosure relates to powder coatings with a sparkle effect that may be substantially free from effect pigments or have a minimum amount of effect pigments, and methods of making and using same.

BACKGROUND

Powder coatings are solvent-free or reduced solvent coating systems used in a number of applications, including automotive coatings, household appliances, architectural and construction components, furniture, agricultural machinery, and electronics. Powder coatings are made of a thermosetting resin system and are typically applied to a substrate electrostatically and cured at elevated temperatures.

Traditionally, in order to achieve a visual sparkle effect in the cured powder coating, effect pigments are used, which are typically particulates that reflect, refract, or transmit light to produce color variations such as luster, sparkle, and shimmer. For example, two-dimensional metallic effect pigments may include small, flat pieces of metal to reflect light and produce a luster.

SUMMARY

The present disclosure provides a powder coating composition comprising a resin and optionally traditional colorants, yet which achieves a sparkle effect without the use of effect pigments or a minimized amount of effect pigments. The present disclosure also includes articles coated with the present sparkle effect powder coating composition.

In one form thereof, the present disclosure provides an article coated with a powder coating, the coating comprising: a sparkle grade value of at least 4, measured using an imaging multi angle spectrophotometer with a 15° illumination angle relative to the normal of a surface of the coated article; and the coating including less than 0.2 wt. % of any effect pigments, based on a total weight of the coating.

In a second form thereof, the present disclosure provides a powder coating composition, comprising: a first component comprising an acid or hydroxyl functional polyester resin; a second component comprising an acid or epoxy functional acrylic resin; the acid or hydroxyl functional polyester resin present in an amount from 10 wt. % to 95 wt. % and the acid or epoxy functional acrylic resin present in an amount from 5 wt. % to 90 wt. %, based on a combined weight of the acid or hydroxyl functional polyester resin and the acid or epoxy functional acrylic resin; and one of the following: one or more colorants, the colorants present in only one of the first and second components; or each of the first and second components including a colorant of the same hue.

In a third form thereof, the present disclosure provides a powder coating composition, comprising: an acid or epoxy functional acrylic resin; at least one optional crosslinker; one or more colorants; and the one or more colorants and the resin with optional crosslinker present in a ratio from 0.7:1 to 1.1:1.

DETAILED DESCRIPTION

I. Definitions

For purposes of the following detailed description, it is to be understood that the disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term “about”. Accordingly, unless indicated to the contrary, the numerical parameters set forth in the following specification and attached claims are approximations that may vary depending upon the desired properties to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of “1 to 10” is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of “or” means “and/or” unless specifically stated otherwise, even though “and/or” may be explicitly used in certain instances. Further, in this application, the use of “a” or “an” means “at least one” unless specifically stated otherwise. For example, “a” polymer, “a” pigment, and the like refer to one or more of any of these items.

“Polymer” refers to oligomers, homopolymers (e.g. prepared form a single monomer species), copolymers (e.g. prepared form at least two monomer species), terpolymers (e.g. prepared from at least three monomer species), and graft polymers.

“Film forming resin” refers to a resin that may form a self-supporting continuous film on at least a horizontal surface of a substrate upon removal or any diluents or carriers.

“Crosslinker” refers to a molecule comprising two or more functional groups that are reactive with other functional groups and that is capable of linking two or more monomers or polymers through chemical bonds.

“Colorants” refers to a pigment which is used to impart color or opacity to the powder coating composition per ASTM E284. As used herein, the term “colorant” differs from effect pigments.

"Effect pigment" refers to flake or plate-like structures that impart a directional light reflectance, scattering, absorption, or optically variable appearance to the substrate in or on which they are applied. Effect pigments may be used to produce coatings having flake appearances such as texture, sparkle, glint, coarseness, and glitter, as well as the enhancement of depth perception in the coatings imparted by the effect pigments.

The terms "gonioapparent flakes," "gonioapparent pigment" or "gonioapparent pigments" refer to effect pigments.

"Flop index" refers to the measurement on the change in reflectance of a metallic color as it is rotated through the range of viewing angles. As used herein, flop index is defined according to Equation 1 below:

$$2.69\ (L^1 - L^3)^{1.11}/(L^2)^{0.86} \qquad (1)$$

wherein:

$L^1$ is CIELAB L* measured at the aspecular angle of 15°

$L^2$ is CIELAB L* measured at the aspecular angle of 45°;

$L^3$ is CIELAB L* measured at the aspecular angle of 110°.

"Substantially free of" as used herein indicates that the composition contains the material in question in an amount of 0.5 wt % or less, based on the entire weight of the composition.

II. Sparkle Effect Powder Coating Compositions

Powder coatings used to provide an effect, such as a metallic-like, appearance in architectural, automotive, aerospace, industrial coatings and the like typically include polymeric base powder particles to which metallic flakes or effect pigments are added to create such an effect. The powder is then typically electrostatically applied to a substrate, and then cured with heat or UV radiation to form a coating layer These powder coatings which provide a distinctive effect (a so-called sparkle effect) typically have a more brilliant effect when the effect pigments are combined with a dark base color. However, due to the high contrast between lighter effect pigments and the dark basic color, the slightest differences in effect concentration are easily discernable. In the case of larger components, undesirable clouds or bandings of the effect pigments can show.

Moreover, effect powder containing coatings are difficult to recycle. During the coating process, the powder which does not adhere to the object will be suction filtered and passed to a cyclone. With effect powder coatings, there is a risk that the fine metallic-effect pigment particles can be separated from the rest of the powder, resulting in a so-called effect drift, which renders the shade of the effect powder coating less metallic over time.

More effective means of achieving sparkle effects in powder coatings without effect pigments are sought to improve homogeneity, application, performance, and appearance of powder coatings.

The powder coating compositions as described herein generally comprise a film forming resin, and one or more colorants. The powder coating compositions may also comprise other additives such as flow agents, colorants, stabilizers, degassing agents, antioxidants, hardening agents, waxes, and the like. The powder coating compositions may also be substantially free of or include a minimal amount of effect pigments. The coating compositions may be applied and cured to form a coating layer on a variety of metallic and non-metallic substrates.

The coating compositions may be layered underneath a powder overcoat which, as used herein, refers to an overcoat embodied in solid particulate form. The coating compositions may also be layered over top of a powder basecoat which, as used herein, refers to a basecoat embodied in solid particulate form. The coating composition may also be layered underneath or above a liquid overcoat, which may be formed by melting or otherwise liquidizing a powder overcoat. Multiple layers of coating compositions may be used to form multi-layer coatings. The coating compositions may be layered underneath a topcoat or series of topcoats, or above a base coat or series of base coats to form a stackup. The coating compositions may also be sprayed over bare metal, pre-treated metal, electrocoat, or a liquid or powder primed surface to form a topcoat. Advantageously, the coating compositions provided herein generate metallic effects without effect pigments which may reduce the compositions weather durability.

III. Resins

The coating compositions herein may comprise a binder or a film forming resin in one or multiple components. Further, a "binder" refers to a constituent material that may hold all coating composition components together upon curing. The binder may comprise one or more film-forming resins that may be used to form the coating layer. As used herein, a "film-forming resin" refers to a resin that may form a self-supporting continuous film on at least a horizontal surface of a substrate upon removal or any diluents or carriers present in the composition and/or upon curing. The term "resin" is used here interchangeably with "polymer". Film forming resins may be incorporated into components of the powder coating compositions as a liquid or as a solid.

The coating composition used with the present disclosure may include any variety of thermosetting powder compositions as known in the art. As used herein, the term "thermosetting" refers to compositions that "set" irreversibly upon curing or crosslinking, wherein polymer chains of polymeric components are joined together by covalent bonds. This property is usually associated with a crosslinking reaction of the composition constituents often induced, for example, by heat or radiation. Once cured, a thermosetting resin will not melt upon the application of heat and is insoluble in solvents. The coating compositions used with the present disclosure may also include thermoplastic powder compositions. As used herein, "thermoplastic" refers to compositions that include polymeric components that are not joined by covalent bonds and, thereby, can undergo liquid flow upon heating.

The coating compositions provided by the present disclosure may comprise two components, each with a film-forming resin. The first component and second component may comprise the same film-forming resin, or different-film forming resins, each in different amounts.

Suitable film-forming resins include (meth)acrylate resins, polyurethanes, polyesters, polyamides, polyethers, polysiloxanes, epoxy resins, vinyl resins, copolymers thereof, and combinations thereof. As used herein, "(meth)acrylate" and like terms refers both to the acrylate and the corresponding methacrylate. Further, the film-forming resins may have any of a variety of functional groups including, but not limited to, carboxylic acid groups, amine groups, epoxide groups, hydroxyl groups, thiol groups, carbamate groups, amide groups, urea groups, isocyanate groups (including blocked isocyanate groups), and combinations thereof.

The first and second components of the coating compositions may comprise any number of film forming resins, such as one film forming resin, or two or more film forming resins. Any particular film forming resin or any combination of film forming resins may be present in the coating composition in an amount of as little as 5 wt. %, 10 wt. %, 15 wt. %, 20 wt. %, 25 wt. %, 30 wt. %, 35 wt. %, 40 wt. %, 45 wt. %, 50 wt. %, 55 wt. % or in an amount as great as 60 wt. %, 65 wt. % 70 wt. % 75 wt. % 80 wt. % 85 wt. %, 90 wt. %, 95 wt. %, or any range including any two of these values as endpoints based on the total weight of the coating composition. For example, any particular film forming resin or any combination of film forming resins may be present in an amount of from 5-95 wt. %, 10-90 wt. % 15-85 wt. %, 20-80 wt. %, 25-75 wt. %, 30-70 wt. %, 35-65 wt. %, 40-60 wt. %, or 45-55 wt. %.

The first and second components of the powder coating composition may be present in a ratio of from 0.5:1 to 1.5:1. For example, the first and second components may be present in a ratio of 0.5:1, 0.6:1, 0.7:1, 0.8:1, 0.9:1, 1:1, 1.1:1, 1.2:1, 1.3:1, 1.4:1 or 1.5:1.

A. Polyester/Acrylic Resin Systems

The present disclosure contemplates a powder coating composition comprising two components, each with their own respective resin. The resin of the first component may comprise an acid or hydroxyl functional polyester resin. The resin of the second component may comprise an acid or epoxy functional acrylic resin. The first and second components may be dry blended with one another via suitable known methods.

The amount of acid or hydroxyl functional polyester resin in the first component may be as low as 10 wt. %, 15 wt. %, 20 wt. %, 25 wt. %, 30 wt. %, 35 wt. %, 40 wt. %, 45 wt. % or as high as 50 wt. %, 55 wt. %, 60 wt. %, 65 wt. %, 70 wt. %, 75 wt. %, 80 wt. %, 85 wt. %, 90 wt. %, 95 wt. %, or within any range encompassed by any two of the foregoing values as endpoints. For example, the amount of acid or hydroxyl functional polyester resin in the first component may be 10-95 wt. % 10-90 wt. % 15-85 wt. %, 20-80 wt. %, 25-75 wt. %, 30-70 wt. %, 35-65 wt. %, 40-60 wt. %, or 45-55 wt. %.

The amount of acid or epoxy functional acrylic resin in the second component may be as low as 5 wt. %, 10 wt. %, 15 wt. %, 20 wt. %, 25 wt. %, 30 wt. %, 35 wt. %, 40 wt. %, 45 wt. % or as high as 50 wt. %, 55 wt. %, 60 wt. %, 65 wt. %, 70 wt. %, 75 wt. %, 80 wt. %, 85 wt. %, 90 wt. %, or within any range encompassed by any two of the foregoing values as endpoints. For example, the amount of acid or epoxy functional acrylic resin in the second component may be 5-90 wt. %, 10-90 wt. % 15-85 wt. %, 20-80 wt. %, 25-75 wt. %, 30-70 wt. %, 35-65 wt. %, 40-60 wt. %, or 45-55 wt. %.

The two-resin powder coating composition may also further comprise one or more colorants, the colorants present in only one of the first and second components; or each of the first and second components including a colorant of the same hue.

B. Polymeric Polyester/Polymeric Epoxy Systems

The present disclosure contemplates a powder coating composition comprising two components, each with their own respective resin. The first component's resin may comprise a polymeric polyester resin. The second component's resin may comprise a polymeric epoxy resin.

The amount of polymeric polyester resin in the first component may be as low as 10 wt. %, 15 wt. %, 20 wt. %, 25 wt. %, 30 wt. %, 35 wt. %, 40 wt. %, 45 wt. % or as high as 50 wt. %, 55 wt. %, 60 wt. %, 65 wt. %, 70 wt. %, 75 wt. %, 80 wt. %, 85 wt. %, 90 wt. %, 95 wt. %, or within any range encompassed by any two of the foregoing values as endpoints. For example, the amount of polymeric polyester resin in the first component may be 10-95 wt. %, 10-90 wt. % 15-85 wt. %, 20-80 wt. %, 25-75 wt. %, 30-70 wt. %, 35-65 wt. %, 40-60 wt. %, or 45-55 wt. %.

The amount of polymeric epoxy in the second component may be as low as 5 wt. %, 10 wt. %, 15 wt. %, 20 wt. %, 25 wt. %, 30 wt. %, 35 wt. %, 40 wt. %, 45 wt. % or as high as 50 wt. %, 55 wt. %, 60 wt. %, 65 wt. %, 70 wt. %, 75 wt. %, 80 wt. %, 85 wt. %, 90 wt. %, or within any range encompassed by any two of the foregoing values as endpoints. For example, the amount of polymeric epoxy in the second component may be 5-90 wt. %, 10-90 wt. % 15-85 wt. %, 20-80 wt. %, 25-75 wt. %, 30-70 wt. %, 35-65 wt. %, 40-60 wt. %, or 45-55 wt. %.

The two-resin powder coating composition may also further comprise one or more colorants, the colorants present in only one of the first and second components; or each of the first and second components including a colorant of the same hue.

C. Acrylic Resin Systems

The present disclosure also contemplates a powder coating composition with a single resin. This resin may be an acid or epoxy functional acrylic resin which may be present in an amount of 5 wt. %, 10 wt. %, 15 wt. %, 20 wt. %, 25 wt. %, 30 wt. %, 35 wt. %, 40 wt. %, 45 wt. % or as high as 50 wt. %, 55 wt. %, 60 wt. %, 65 wt. %, 70 wt. %, 75 wt. %, 80 wt. %, 85 wt. %, 90 wt. %, 95 wt. %, or within any range encompassed by any two of the foregoing values as endpoints. For example, the amount of acid or epoxy functional resin may be 5-95 wt. %, 10-90 wt. % 15-85 wt. %, 20-80 wt. %, 25-75 wt. %, 30-70 wt. %, 35-65 wt. %, 40-60 wt. %, or 45-55 wt. %.

The single resin powder coating composition may also further comprise at least one optional crosslinker and one or more colorants.

The one or more colorants and the resin with optional crosslinker may be present in a ratio of from 0.7:1, 0.8:1, 0.9:1, 1:1, or 1.1:1.

IV. Crosslinkers

The coating compositions of the present disclosure may comprise a crosslinker in one or multiple components that may be selected from any of the crosslinkers known in the art to react with the functionality of one or more film-forming resins used in the coating composition. As used herein, the term "crosslinker" refers to a molecule comprising two or more functional groups that are reactive with other functional groups and that is capable of linking two or more monomers or polymers through chemical bonds. Alternatively, the film-forming resins that form the binder of the coating composition may have functional groups that are reactive with themselves; in this manner, such resins are self-crosslinking.

Suitable crosslinkers include phenolic resins, amino resins, epoxy resins, triglycidyl isocyanurate (TGIC), beta-hydroxy (alkyl) amides (HAA), 1,12-dodecane dioic acid (DDDA), alkylated carbamates, (meth)acrylates, isocyanates, blocked isocyanates, polyacids, anhydrides, organometallic acid-functional materials, polyamines, polyamides, aminoplasts, carbodiimides, oxazolines, tetrakis(methoxymethyl)glycoluril, and combinations thereof.

Any particular crosslinker or any combination of crosslinkers may be present in the coating composition in an amount of as little as 0.0001 wt. %, 0.001 wt. %, 0.01 wt. %, 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 15 wt. %, 20 wt. %, 25 wt. % or in an amount as great as 30 wt. %, 35 wt. %, 40 wt. %, 45 wt. %, 50 wt. %, or any range including two of these values as endpoints based on the total weight of the coating composition. Any crosslinker or combination of crosslinkers may be present in an amount from 0.5 wt. % to 10 wt. %, from 0.5 wt. % to 8 wt. %, from 0.5 wt. % to 6 wt. %, from 0.5 wt. % to 5 wt. %, from 1 wt. % to 5 wt. %, from 1 wt. % to 4 wt. %, or from 1 wt. % to 2 wt. % based on the total weight of the coating composition or based on the weight of one component of the coating composition.

V. Effect Pigments

As described herein, the powder coating compositions of the present disclosure may be free of, substantially free of, or contain a minimal amount of effect pigments. Effect pigments are typically defined as flake or plate like structures that impart a directional light reflectance, scattering, absorption, or optically variable appearance to the substrate in or on which they are applied. Effect pigments may be used to produce coatings having flake appearances such as texture, sparkle, glint, coarseness, and glitter, as well as the enhancement of depth perception in the coatings imparted by the pigments.

Examples of effect pigments can include, but are not limited to, light absorbing pigments, light scattering pigments, light interference pigments, light reflecting pigments, fluorescent or phosphorescent pigments, thermochromic pigment, photochromic pigment, and gonioapparent pigments. Metallic particles or flakes can be examples of such effect pigments. They can be particles or flakes with specific or mixed shapes and dimensions. The term "gonioapparent flakes," "gonioapparent pigment" or "gonioapparent pigments" refers to effect pigments.

As used herein, reference to "effect" pigments is intended to include "metallic" pigments. Examples of metallic pigments include mica (including coated, natural and synthetic mica), metal oxide (such as aluminum, bronze, copper, stainless steel and gold), and glass (such as borosilicate glass, barium titanate glass particles, soda lime glass particles, and metal oxide coated glass). Commercially available pigments include for example those referred to as Xirallic®, Dynacolor®, Mearlin®, Luxan®, Sunmica®, STANDART®, and the like pigment.

VI. Additives

The powder coating composition may further optionally comprise one or more additives known in the art. Such additives may include flow control agents, flow restricting agents, dry flow agents, antioxidants, pigments, colorants, optical brighteners, extenders, surface control agents, waxes, catalysts, reaction inhibitors, corrosion-inhibitors, conductivity enhances, and combinations comprising at least one of the foregoing additives, and the like.

The composition may also comprise a colorant. As used herein, "colorant" refers to any substance that imparts color and/or other opacity to the composition. The colorant may be added to the coating in any suitable form, such as discrete particles, dispersions, or solutions. A single colorant or a mixture of two or more colorants may be used in the coatings of the present disclosure. Colorants are different from, and distinct from, effect pigments.

Colorants can be organic or inorganic dyes and tints, such as those used in the paint industry and/or listed in the Dry Color Manufacturers Association (DCMA), as well as special effect compositions. A colorant may include a finely divided solid powder that is insoluble, but wettable, under the conditions of use. A colorant may be organic or inorganic and may be agglomerated or non-agglomerated. Colorants may be incorporated into the coatings by use of a grind vehicle, such as an acrylic grind vehicle, the use of which will be familiar to one skilled in the art.

Colorants and/or colorant compositions may include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof.

Colorants may also include, but are not limited to, those that are solvent and/or aqueous based such as phthalo green or blue, iron oxide, bismuth vanadate, anthraquinone, and peryleneand quinacridone.

Colorants may be incorporated into the first component, second component, or both components of the powder coating composition. If both components comprise a colorant, the colorant in each component may be of the same hue as defined by ASTM E284. This assessment of hue may be done visually or with an instrument after the powder coating composition is sprayed onto a substrate.

The powder coating composition may further optionally comprise flow control agents, sometimes called leveling agents, which are useful to promote the formation of a continuous and even coating. Suitable flow control agents include polyacrylic esters, non-ionic fluorinated alkyl ester surfactants, non-ionic alkylarylpolyether alcohols, silicones, and the like, and combinations comprising at least one of the foregoing flow control agents. Flow control agents are generally liquids that have been converted to powder form by absorption onto silica-type materials. One flow control agent is a 2-propenoic acid, ethyl ester polymer acrylic resin, available under the tradename RESIFLOW® P-67 by Estron Chemical, Inc.; a 2-hydroxy-1,2-diphenylethanone crystalline solid that is believed to keep the molten coating open for a suitable time to allow outgassing to occur prior to the formation of the hard-set film, sold under the tradename Benzoin by DSM, Inc. The powder coating composition may also include a dry flow agent such as fumed silica or colloidal aluminum oxide such as the ones sold under the tradename AEROSIL® by Evonik Corporation.

Any particular additive or any combination of additives may be present in the coating composition in an amount of as little as 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, or as great as 20 wt. %., 19 wt. %, 18 wt. %, 17 wt. %, 16 wt. %, 15 wt. %, 14 wt. %, 13 wt. %, 12 wt. %, or any range including any two of these values as endpoints based on the total weight of the coating composition.

As described in section III above, the coating composition may comprise an acid or epoxy functional acrylic resin, together with an optional crosslinker, i.e., the crosslinker, if present, and one or more optional colorants. The ratio between the colorant to resin with optional crosslinker may be from 0.5:1 to 1.5:1. For example, the (colorant):(resin with optional crosslinker) ratio may be 0.5:1, 0.6:1, 0.7:1, 0.8:1, 0.9:1, 1:1, 1.1:1, 1.2:1, 1.3:1, 1.4:1 or 1.5:1.

VII. Other Components

In addition to the components described above the powder coating composition of the present disclosure may be free from certain other components such as texturing agents. Texturing agents may help produce a coating with a textured surface by controlling the powder composition's surface tension or by being incompatible or insoluble in the powder composition.

These other components include but are not limited to fluorine-containing polymers, pre-cross-linked acrylic copolymer, polyethylene, polypropylene, polyphenylene sulfide, polyether ether ketone, polyvinyl chloride, ionomers, polyamides, and copolymers of the foregoing; wax, and, silicone-containing polymers.

The other components may also include components which have a melt temperature greater than 210° C. as determined by differential scanning calorimetry (DSC) according to ASTM D3418-21. The coating may comprise less than 0.5 wt. % of any components having a melt temperature greater than 210° C. as determined by differential scanning calorimetry (DSC) according to ASTM D3418-21.

The other components may comprise less than 5 wt. %, less than 4 wt. %, less than 3 wt. %, less than 2 wt. %, less than 1 wt. %, less than 0.9 wt. %, less than 0.8 wt. % less than 0.7 wt. %, less than 0.6 wt. %, less than 0.5 wt. %, less than 0.4 wt. %, less than 0.3 wt. %, less than 0.2 wt. %, less than 0.1 wt. %, less than 0.01 wt. %, less than 0.001 wt. %, or less than 0.0001 wt. % of the power coating composition.

VIII. Substrates

The present disclosure contemplates contacting at least a portion of a substrate with multi-component powder coating composition and curing the composition to form a coated article.

The substrate according to the present disclosure can be selected from a wide variety of substrates and combinations thereof. Substrates may include vehicles and automotive substrates, industrial substrates, marine substrates and components such as ships, vessels, and on-shore and off-shore installations, storage tanks, packaging substrates, aerospace components, wood flooring and furniture, fasteners, coiled metals, heat exchangers, vents, an extrusion, roofing, wheels, grates, belts, conveyors, grain or seed silos, wire mesh, bolts or nuts, a screen or grid, HVAC equipment, frames, tanks cords, wires, apparel, electronic components, including housings and circuit boards, glass, sports equipment, including golf balls, stadiums, buildings, bridges, containers such as a food and beverage containers, and the like. As used herein, "vehicle" or variations thereof includes, but is not limited to, civilian, commercial and military aircraft, and/or land vehicles such as airplanes, helicopters, cars, motorcycles, and/or trucks. The shape of the substrate can be in the form of a sheet, plate, bar, rod or any shape desired.

The substrates, including any of the substrates previously described, can be metallic or non-metallic. Metallic substrates include, but are not limited to, tin, steel, cold rolled steel, hot rolled steel, steel coated with zinc metal, zinc compounds, zinc alloys, electrogalvanized steel, hot-dipped galvanized steel, galvannealed steel, galvalume, steel plated with zinc alloy, stainless steel, zinc-aluminum magnesium alloy coated steel, zinc-aluminum alloys, aluminum, aluminum alloys, aluminum plated steel, aluminum alloy plated steel, steel coated with a zinc-aluminum alloy, magnesium, magnesium alloys, nickel, nickel plating, bronze, tinplate, clad, titanium, brass, copper, silver, gold, 3-D printed metals, cast or forged metals and alloys, or combinations thereof.

Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, engineering polymers such as poly(etheretherketone) (PEEK), polycarbonate acrylobutadiene styrene (PC/ABS), polyamide, wood, veneer, wood composite, particle board, medium density fiberboard, cement, stone, glass, paper, cardboard, textiles, leather both synthetic and natural, composite substrates such as fiberglass composites or carbon fiber composites, 3-D printed polymers and composites, and the like.

IX. Coating Methods

The components of the powder coating compositions may be contacted through mixing, grinding, or any suitable contacting method. The components may be a solid and more specifically may be a powder. The individual components may be contacted in any suitable ratio to form the coating composition.

The substrate may be preheated to a surface temperature or a bulk temperature before the application of the coating composition. The substrate may be heated to a surface temperature of as little as 100° F., 125° F., 150° F., 175° F., 200° F., or as great as 225° F., 250° F., 275° F., 300° F., 325° F., 350° F., 375° F., 400° F., or any range including any two of these values as endpoints. Stated differently, the substrate may be heated to a surface temperature of as little as 40° ° C., 50° C., 60° C., 70° ° C., 80° C., 90° C., 100° C., 110° C., or as great as 120° C., 130° C., 140° C., 150° C., 160° C., 170° C., 180° C., 190° C., 200° C., 210° C. or any range including any two of these values as endpoints. The substrate may be heated to a surface temperature from 40° C. to 150° C., from 50° C. to 150° C., from 60° C. to 150° C., from 70° C. to 150° C., from 80° C. to 150° C., from 90° C. to 150° C., from 100° C. to 150° C., from 110° C. to 150° C., from 110° C. to 140° C., or from 120° ° C. to 140° C.

Once the coating composition has been applied to the substrate, the coating is cured. The curable coating composition may be cured with heat, pressure, chemically such as with moisture, or with other means such as actinic radiation, and combinations thereof. Curing may comprise an initial curing step with radiation, followed by heating. The term "actinic radiation" refers to electromagnetic radiation that can initiate chemical reactions. Actinic radiation includes, but is not limited to, visible light, ultraviolet (UV) light, infrared (IR), X-ray, and gamma radiation.

The coating composition may be cured at a low temperature. The coating composition may be cured at less than 450° F., less than 425° F., less than 400° F., less than 375° F., less than 350° F., less than 325° F., less than 300° F., less than 290° F., less than 280° F., less than 275° F., less than 270° F., less than 260° F., less than 250 OF, or any range including any two of these values as endpoints. Stated differently, the coating composition may be cured at less than 240° C., less than 230° C., less than 220° C., less than 210° C., less than 200° C., less than 190° C., less than 180 ° C., less than 170° C., less than 160° C., less than 150° C., less than 140° C., less than 130° C., less than 120° C., or any range including any two of these values as endpoints. The coating composition may be cured at a temperature from 120° C. to 200° C., from 120° C. to 190° C., from 120° C. to 180° C., from 120° C. to 170° C., from 120° C. to 160° C., from 120° C. to 150° C., from 120° C. to 140° ° C., or from 120° C. to 130° C.

The curing step may be carried out for any suitable time to allow the coating to fully or at least partially cure. The curing time may vary depending on the substrate, the coating composition, the coating thickness, ambient conditions, curing methods, or any combination of these factors. Curing time may be as little as 1 minute, 2 minutes, 3 minutes, 4 minutes, 5 minutes, 6 minutes, 7 minutes, 8 minutes, 9 minutes, 10 minutes, or as great as 60 minutes, 55 minutes, 50 minutes, 45 minutes, 40 minutes, 35 minutes, 30 minutes, 25 minutes, 20 minutes, 15 minutes, 12 minutes, or any range including any two of these values as endpoints. The curing time may be from 1 minute to 30 minutes, from 1 minute to 20 minutes, from 1 minute to 15 minutes, from 1 minute to 10 minutes, from 1 minute to 6 minutes, from 5 minutes to 15 minutes, from 5 minutes to 10 minutes, or from 3 minutes to 9 minutes.

The overall coating on the substrate may have a thickness of as little as 0.1 mils, 0.2 mils, 0.3 mils, 0.4 mils, 0.5 mils, 0.6 mils, 0.7 mils, 0.8 mils, 0.9 mils, 1 mil, 1.5 mils, 2 mils, 2.5 mils or as great as 20 mils, 15 mils, 14 mils, 13 mils, 12 mils, 11 mils, 10 mils, 9 mils, 8 mils, 7 mils, 6 mils, 5 mils, 4 mils, 3.9 mils, 3.8 mils, 3.7 mils, 3.6 mils, 3.5 mils, 3.4 mils, 3.3 mils, 3.2 mils, 3.1 mils, 3 mils, or any range including any two of these amounts as endpoints. The overall coating may have a thickness of 1 mils to 4 mils, 1.5 mils to 2.5 mils, or 2 mils to 3 mils. The thickness may be measured according to the ASTM D7091-13 test method using and Elcometer 415 Model B Dual FNF film gauge.

Other application methods that can be used to apply the coating composition onto the substrate include: spraying, such as by incorporating the coating composition into a liquid formulation and using spray equipment; wiping where the coating composition is contained on and/or in a wipe and manually or automatically wiped; media blasting where the coating composition is a solid and is blasted onto the substrate's surface; electrostatically applied as a powder; vapor deposition; electrodeposition where the formulation is liquid and is electro-coated; or any combination thereof. The coating composition may also be applied in-mold, during extrusion, during a calendaring, or during other processing of substrate materials.

The coating composition may be applied directly to a substrate without any intermediate layers between the coating composition and the substrate. The coating composition may be applied directly to a metal substrate, before or after the substrate is cleaned and/or treated as further described herein, but before application of any coating layers. The coating composition may also be applied during cleaning such as a component of the cleaner. The coating composition may be applied over the entire surface, edges, and corners of the substrate, or the coating composition may be applied over selected portions of the substrate.

The coating composition may also form a continuous or semi-continuous layer over the substrate, or the coating composition may be applied over certain spots/areas of the substrate such as the edges and corners of the substrate. As used herein, the area referred to as the "edge" will vary based on the particular substrate but may include, e.g., the outer most lateral face of the substrate.

The coating composition can be applied to the substrate to form a monocoat. As used herein, a "monocoat" refers to a single coating layer that is free of additional coating layers. Thus, the coating composition can be applied directly to a substrate and cured to form a single layer coating, i.e., a monocoat.

The coated substrate of the present disclosure may further comprise one or more additional coating layers, such as a second overcoat deposited onto at least a portion of the first coating composition, to form a multi-layer coating such as by applying a topcoat. When a multi-layer coating is formed, the first coating composition can be cured prior to application of additional overcoats, or one or more of the additional overcoats and the first coating composition can be cured simultaneously. It is appreciated that the second overcoat and additional overcoat can be in solid or liquid form. The coating compositions may be layered underneath a topcoat or series of topcoats to form a stackup.

X. Coated Article Properties

Coated articles according present disclosure may have one or more improved properties and may address one or more issues known in the coating industry. The improved properties may be observed in comparison to other, previously known coating compositions.

The coated articles in accordance with the present disclosure may have a sparkle effect which can be measured using an imaging multi-angle spectrophotometer.

According to measurements made with the spectrophotometer, the coated articles may have a sparkle grade of as low as 0.00, 1.00, 2.00, 3.00, 4.00, 5.00, 6.00, 7.00, 8.00, 9.00 or as high as 10.00, 11.00, 12.00, 13.00, 14.00, 15.00, or within any range encompassed by any two of the foregoing values as endpoints.

The sparkle grade measurement may be made at an illumination angle relative to the normal of a surface of the coated article of 15°

The coated articles in accordance with the present disclosure may also have a flop index which is defined according to Equation 1 below:

$$2.69\left(L^1 - L^3\right)^{1.11} / \left(L^2\right)^{0.86} \quad (1)$$

wherein:

$L^1$ is CIELAB L* measured at the aspecular angle of 15°

$L^2$ is CIELAB L* measured at the aspecular angle of 45°;

$L^3$ is CIELAB L* measured at the aspecular angle of 110°.

The flop index of the coated articles may be as low as 1, 2, 3, 4, 5, 6, 7, 8, 9 or as high as 10, 11, 12, 13, 14, 15 16, 17, 18, or within any range encompassed by any two of the foregoing values as endpoints. The coating may comprise a flop index of at least 2.

EXAMPLES

Preparation of Curable Coating Compositions Showing Mixing and Sparkle Present Without Cross-Linker The following compositions were prepared using the raw materials shown below in Table 1. It should be noted that the components in composition 2 are the combination of compositions 1 and 4.

TABLE 1

| Material | Description | Composition 1 Acrylic powder | Composition 2 Co-extruded acrylic powder + polyester powder | Composition 3 Acrylic powder without cross-linker | Composition 4 Polyester powder |
|---|---|---|---|---|---|
| ReaFree 5700 | Acid functional polyester | 0.00 | 41.56 | 0.00 | 65.78 |
| TGIC | Epoxy functional crosslinker | 0.00 | 3.10 | 0.00 | 4.90 |
| MODAFLOW ® Powder III | Flow additive | 0.72 | 0.72 | 0.73 | 0.73 |
| Benzoin | Degassing agent | 0.85 | 0.85 | 0.86 | 0.85 |
| Monarch 1300 | Carbon black | 0.00 | 0.79 | 0.00 | 1.50 |
| TIOXIDE TR93 | Titanium dioxide | 0.00 | 13.81 | 0.00 | 26.24 |
| Almatex PD76100 | GMA acrylic (epoxy functional) | 83.22 | 33.12 | 98.42 | 0.00 |
| DDDA | Acid functional crosslinker | 15.20 | 6.05 | 0.00 | 0.00 |

The above-mentioned compositions were prepared by pre-mixing the formulas using a three-blade mixer rotating at approximately 3500 rpm for 30 seconds. The pre-mix was extruded using a 19 mm twin screw Baker Perkins extruder with an aggressive screw configuration at 450 rpm. The first zone was held near room temperature and the second, third, and fourth zones were set to 110° C. The extrudate was cooled between chill rollers and broken into chips. Chips were ground either with a Mikro ACM® or a Strand Mill to a particle size between 25-50 microns. Samples were prepared by extrusion, co-grinding, or dry blending. Extruded samples underwent the above-mentioned procedure. Co-ground samples were prepared by mixing a 50-50 mixture by weight of the above-mentioned chips and grinding the mixture. Samples prepared by drying blending were prepared by shaking the ground powders in a bag or container for at least 1 minute. Unless otherwise indicated all samples were prepared at a 50-50 mixture by weight.

The compositions were sprayed electrostatically by adding the powder to the application cup and electrostatically (via Encore LT Manual electrostatic spray gun) spraying the powder to a grounded black e-coat panel (ACT, Item Number 44049). Panels were cut to a size of 4"×6". Directly after spray application, panels were baked in an electric oven at 191° ° C. for 20 minutes with a resulting film thickness between 2-4 mils. Cured films were evaluated for color using a BYK-mac I metallic color multi-angle spectrophotometer manufactured by BYK-Gardner. For the purposes here the L value (a measure of brightness) is reported at various angles and sparkle grade at various angles are reported.

TABLE 2

| Example # | Powder A | Powder B | Preparation Method | Flop Index | SG15 |
|---|---|---|---|---|---|
| Comparative Example 1 | Comp. 2 | None | Co-extruded | 0.00 | 0.00 |
| 2 | Comp. 1 | Comp. 4 | Dry blending | 0.63 | 8.98 |
| 3 | Comp. 1 | Comp. 3 | Dry blending | 1.31 | 11.13 |

Example 1 demonstrates that when co-extruding no sparkle and no gonioapparent effect is observed. When dry blending in Examples 2 and 3 respectively a high sparkle value (sparkle grade at 15°) and a gonioapparent appearance is observed even though the components in composition 2 is the combination of compositions 1 and 4. The gonioapparent appearance is based on angular dependence of the brightness (L value) of the Examples.

Preparation of Curable Coating Compositions Showing Effect of Two-Color Pigments Compositions were prepared using the materials in Table 3. These were prepared in a similar method as described above. An additional row has been included to specify the resulting color of the powder in Table 3. Samples were sprayed on pre-treated steel (ACT part no. 26241).

TABLE 3

| Material/Color | Description | Composition | | | | | | |
|---|---|---|---|---|---|---|---|---|
| | | Composition 5 | Composition 6 | Composition 7 | Composition 8 | Composition 9 | Composition 10 | 11 |
| GMA 300 | GMA Acrylic resin | 0.00 | 0.00 | 70.00 | 0.00 | 0.00 | 0.00 | 0.00 |
| Isocryl 570 | GMA Acrylic | 0.00 | 0.00 | 0.00 | 70.00 | 60.13 | 0.00 | 89.94 |
| Joncryl 819 | Acid functional acrylic | 0.00 | 0.00 | 0.00 | 0.00 | 0.00 | 63.27 | 0.00 |
| Uralac p836 | Acid functional polyester | 61.83 | 0.00 | 0.00 | 0.00 | 0.00 | 0.00 | 0.00 |
| Uralac P878 | Acid functional polyester | 0.00 | 68.00 | 0.00 | 0.00 | 0.00 | 0.00 | 0.00 |
| DDDA | Acid functional crosslinker | 0.00 | 0.00 | 0.00 | 0.00 | 9.87 | 0.00 | 0.00 |
| Primid XL522 | Hydroxyl functional crosslinker | 3.61 | 9.78 | 0.00 | 0.00 | 0.00 | 6.73 | 10.06 |
| Ceraflour 960 | Wax | 1.00 | 0.00 | 0.00 | 0.00 | 0.00 | 0.00 | 0.00 |
| PL 200 | Flow add | 0.20 | 0.00 | 0.00 | 0.00 | 0.00 | 0.00 | 0.00 |
| Benzoin | Degassing agent | 0.20 | 0.00 | 0.00 | 0.00 | 0.00 | 0.00 | 0.00 |
| Tioxide TR 93 | White colorant | 6.98 | 22.22 | 20.00 | 20.00 | 20.00 | 20.00 | 0.00 |
| Red 254 | Red colorant | 0.25 | 0.00 | 0.00 | 0.00 | 0.00 | 0.00 | 0.00 |
| Regal 660A | Black colorant | 1.50 | 0.00 | 0.00 | 0.00 | 0.00 | 0.00 | 0.00 |
| Lansco 2151 | Yellow colorant | 1.40 | 0.00 | 0.00 | 0.00 | 0.00 | 0.00 | 0.00 |
| Blanc Fix N | Filler | 23.05 | 11.11 | 10.00 | 10.00 | 10.00 | 10.00 | 0.00 |
| Color | | Grey | White | White | White | White | White | Clear |

The following compositions were prepared by dry blending using the Examples described above. These were then electrostatically sprayed and evaluated with the BYK Mac I in Table 4. In addition to the compositions in Table 3, a commercial powder, Enviracryl XMR clear (PPG product code: PCC 10103) was also used in Example 12.

TABLE 4

| Example # | Powder A | Powder A (wt. %) | Powder B | Powder B (wt. %) | Flop Index | SG15 |
|---|---|---|---|---|---|---|
| Comparative Example 4 | Comp 5 | 50 | Comp 6 | 50 | 0.50 | 1.01 |
| Comparative Example 5 | Comp 5 | 50 | Comp 7 | 50 | 2.20 | 1.77 |
| Comparative Example 6 | Comp 5 | 50 | Comp 8 | 50 | 0.11 | 0.00 |
| Comparative Example 7 | Comp 5 | 60 | Comp 8 | 40 | 1.82 | 1.52 |
| Comparative Example 8 | Comp 5 | 50 | Comp 9 | 50 | 1.38 | 2.09 |
| 9 | Comp 5 | 50 | Comp 10 | 50 | 1.37 | 2.44 |
| 10 | Comp 5 | 60 | Comp 11 | 40 | 7.26 | 4.63 |
| 11 | Comp 5 | 50 | Comp 11 | 50 | 8.04 | 4.74 |
| 12 | Comp 5 | 50 | PCC 10103 | 50 | 7.89 | 4.41 |

Only a slight and non-significant sparkle was observed when dry blending the grey polyester with a white powder (Examples 4-9). When removing the white colorant (Examples 10, 11 and 12) a sparkle (sparkle grade at 15) was observed along with a significant gonioapparent appearance. Comparing Examples 10 and 11 to Example 12 highlights the sparkle effect can be achieved using both an acid functional acrylic and epoxy functional acrylic and through the use of a primid crosslinker.

Preparation of Curable Coating Compositions Showing Ranges of Polyester to Acrylic Four PPG commercial powders were prepared by dry blending using the procedure described above. The powders used were a red polyester-TGIC powder (PPG product code: PCTA 69106), a clear polyester (PPG product code: 351-1160), a urethane polyester-based powder (PCU75134) and Enviracryl XMR clear (PPG product code: PCC 10103). Compositions were sprayed electrostatically to a grounded black e-coat panel (ACT part number Item Number 44049). Color values were then measured on the BYK-mac I and shown in Table 5.

TABLE 5

| Example # | Powder A | Powder A (wt. %) | Powder B | Powder B (wt. %) | Flop Index | SG15 |
|---|---|---|---|---|---|---|
| Comparative Example 13 | Red polyester TGIC | 50 | Clear TGIC-polyester | 50 | 0.15 | 0.38 |
| Comparative Example 14 | Red polyester TGIC | 100 | none | 0 | 0.35 | 0.96 |
| Comparative Example 15 | Black urethane | 100 | None | 0 | 0.00 | 0.32 |
| 16 | Red polyester TGIC | 95 | Clear GMA acrylic | 5 | 5.8 | 8.86 |
| 17 | Red polyester TGIC | 90 | Clear GMA acrylic | 10 | 10.2 | 5.96 |
| 18 | Red polyester TGIC | 85 | Clear GMA acrylic | 15 | 11.1 | 6.81 |
| 19 | Red polyester TGIC | 75 | Clear GMA acrylic | 25 | 10.0 | 8.71 |
| 20 | Red polyester TGIC | 65 | Clear GMA acrylic | 35 | 6.21 | 9.90 |
| 21 | Red polyester TGIC | 50 | Clear GMA acrylic | 50 | 3.86 | 8.51 |
| 22 | Red polyester TGIC | 35 | Clear GMA acrylic | 65 | 3.47 | 7.18 |
| 23 | Red polyester TGIC | 25 | Clear GMA acrylic | 75 | 3.42 | 6.21 |
| 24 | Black urethane | 10 | Clear GMA acrylic | 90 | 14.69 | 5.52 |
| 25 | Black urethane | 50 | Clear GMA acrylic | 50 | 34.50 | 10.70 |
| 26 | Black urethane | 70 | Clear GMA acrylic | 30 | 6.89 | 4.12 |

"Urethane" as it appears in Table 5 above refers to a hydroxyl functional polyester being reacted with a blocked isocyanate. Within the range of compositions tested Examples 13, 14, and 15 did not demonstrate a sparkle effect. Examples 14 and 15 demonstrate the base powder alone did not show any sparkle effect or gonioapparent appearance. Example 13 consists of a miscible red and clear polyester powder; however, when the clear polyester is substituted with a clear acrylic (Example 21) at the same ratio a sparkle (sparkle grade at 15) was observed along with the gonioapparent appearance. The neat clear acrylic powder (PPG product code: PCC 10103) was not included because values would simply be that of substrate due it's transparency. Examples 16-26 in a range of acid functional and hydroxyl functional polyesters and acrylics at different ratios in which the sparkle grade and angular dependence can be observed.

Sparkle Cut Off Criteria

A commercial red polyester (PPG product code: PCT 69106) was used to bond a mica flake at select loadings. An acoustical powder bonding process was used which is discussed in reference WO22066940 A1. The Examples were then prepared by dry blending the sample with a 50:50 mixtures by weight with a clear polyester (PPG product code: 351-1160). Compositions were prepared via dry blending and sprayed electrostatically to a grounded black e-coat panel (ACT Item Number 44049). Color values were then measured on the BYK-mac I and shown in Table 6. In the table, the concentration of flake bonded to the red polyester is reported along with the total percent pigment volume concentration (% PVC) after dry blending and spraying the panels.

TABLE 6

| Example # | Powder A | Flake Loading Bonded (wt. %) | Flake Type | Powder B | Flake PVC (%) | Flop Index | SG15 |
|---|---|---|---|---|---|---|---|
| 27 | Red polyester TGIC | 0.05 | 139X | 351-1160 | 0.010 | 0.35 | 1.81 |
| 28 | Red polyester TGIC | 0.1 | 139X | 351-1160 | 0.020 | 0.60 | 2.60 |
| 29 | Red polyester TGIC | 0.2 | 139X | 351-1160 | 0.040 | 0.95 | 3.84 |
| 30 | Red polyester TGIC | 0.4 | 139X | 351-1160 | 0.081 | 1.16 | 4.54 |
| 31 | Red polyester TGIC | 1 | 139X | 351-1160 | 0.407 | 4.63 | 6.34 |
| 32 | Red polyester TGIC | 0.05 | 139P | 351-1160 | 0.011 | 0.41 | 2.10 |
| 33 | Red polyester TGIC | 0.1 | 139P | 351-1160 | 0.022 | 0.47 | 2.67 |
| 34 | Red polyester TGIC | 0.2 | 139P | 351-1160 | 0.044 | 0.39 | 3.09 |
| 35 | Red polyester TGIC | 0.4 | 139P | 351-1160 | 0.087 | 0.65 | 4.23 |
| 36 | Red polyester TGIC | 1 | 139P | 351-1160 | 0.439 | 2.91 | 7.66 |

At lower loadings in Examples 27-29 and 32-34 (0.05-0.2 wt %) both flakes show little to no sparkle. At higher PVC levels, a significantly higher flake sparkle grade value is achieved indicative of a visual sparkle effect (sparkle grade at 15). This effect is estimated to onset for % PVC greater than 0.06 when fitting the above data to a x/(x+C) saturation curve where x represents % PVC and C is a constant. These sparkle grade at 15 values are significantly lower than the measured value in Example 21 of the flake free composition.

High P/B Acrylic

Compositions were prepared using the following composition shown below in Table 7 using a similar procedure described above.

TABLE 7

| Component | Description | Composition | | | | | | |
|---|---|---|---|---|---|---|---|---|
| | | Composition 12 | Composition 13 | Composition 14 | 15 | 16 | 17 | Composition 18 |
| Almatex PD-760 | Epoxy functional GMA acrylic | 0.00 | 57.80 | 53.53 | 49.33 | 45.06 | 40.81 | 36.58 |
| DDDA | Acid functional crosslinker | 0.00 | 10.20 | 9.45 | 8.71 | 7.95 | 7.20 | 6.46 |
| SP-6400 | Acid functional polyester | 59.39 | 0.00 | | | | | |
| TGIC | Epoxy functional crosslinker | 4.48 | 0.00 | | | | | |
| PL 200 | Flow add | 1.00 | 1.00 | 1.00 | 1.01 | 0.98 | 0.99 | 0.99 |
| Benzoin | Degassing agent | 1.00 | 1.00 | 1.00 | 1.01 | 0.98 | 0.99 | 0.99 |
| Micromide 520L | Wax | 0.51 | 0.51 | | | | | |
| Billons ™ BLR-698 | White colorant | 25.81 | 25.81 | 23.10 | 26.95 | 30.80 | 34.64 | 38.50 |
| Cinilex DPP Red SRC1 | Red colorant | 7.82 | 7.82 | 6.90 | 8.05 | 9.20 | 10.35 | 11.50 |

After grinding samples were sprayed on pre-treated steel (ACT part no. 26241) and measured on the BYK-mac I and shown in Table 8.

TABLE 8

| Example # | Com-position | P/B | Flop Index | Sparkle Grade at 15° |
|---|---|---|---|---|
| Comparative Example 37 | Comp 12 | 0.53 | 0.26 | 0.50 |
| Comparative Example 38 | Comp 13 | 0.44 | 0.00 | 0.90 |
| Comparative Example 39 | Comp 14 | 0.56 | 1.98 | 3.61 |
| 40 | Comp 15 | 0.69 | 4.34 | 7.90 |
| 41 | Comp 16 | 0.85 | 2.87 | 12.91 |
| 42 | Comp 17 | 1.04 | 0.37 | 7.06 |
| Comparative Example 43 | Comp 18 | 1.28 | 0.31 | 0.00 |

Example 39 begins to show a slight gonioapparent appearance based on the angular dependence on brightness. Example 40 shows a stronger dependence along with a sparkle grade above 4 with the effect going away in Example 43. The resin used in Example 37 show minimal angular dependence and no sparkle due to the resin differences.

Colorant Systems

Compositions were prepared using the following composition shown below in the table using a similar procedure described above.

TABLE 9

| Component | Description | Comparative Composition 19—Black acrylic | Comparative Composition 20—Black polyester |
|---|---|---|---|
| Almatex PD-760 | Epoxy functional GMA acrylic | 80.97 | 0.00 |
| DDDA | Acid functional crosslinker | 14.29 | 0.00 |
| SP-6400 | Acid functional polyester | 0.00 | 15.00 |
| TGIC | Epoxy functional crosslinker | 0.00 | 1.13 |
| PL 200 | Flow add | 1.50 | 0.16 |
| Benzoin | Degassing | 0.75 | 0.16 |
| Micromide 520L | Wax | 0.99 | 0.19 |
| Monarch 1300 | Blank colorant | 1.50 | 0.16 |
| Blanc Fix N | Filler | 0.00 | 2.55 |

Composition 17 and 18 were sprayed separately (Example 43 and 44) along with a 50:50 wt % blend of the two compositions prepared via dry blending (Example 45). Samples were sprayed and cured on pre-treated steel (ACT part no. 26241) and measured on the BYK Mac i.

TABLE 10

| Example # | Composition | Flop Index | Sparkle Grade at 15 |
|---|---|---|---|
| Comparative Example 44 | Comp 19 | 6.84 | 1.51 |
| Comparative Example 45 | Comp 20 | 11.45 | 2.9 |
| 46 | 50:50 wt % comp 19 and comp 20 | 92.16 | 14.6 |

Example 44 and 45 show no sparkle effect as shown in Table 10 above. In addition, both Examples also demonstrate similar L values throughout the entire range of L values measured indicating a similar color. Upon dry blending in Example 46, a larger gonioapparent effect is observed in addition to a large sparkle value indicating the same colorantation can result in the generation of a sparkle and gonioapparent appearance.

A further powder coating composition was prepared using the procedure described above. A grey hybrid powder composition was sprayed neat along with being dry blended with PPG product code PCC 10103. The general formula for the grey hybrid powder formulation is shown in Table 11. The two compositions were sprayed electrostatically to a grounded black e-coat panel (ACT part number Item Number 44049). Color values were then measured on the BYK-mac I and shown in Table 12.

TABLE 11

| Description | Component (wt. % ) |
|---|---|
| Acid functional polyester | 60.4 |
| Epoxy resin | 27.2 |
| Flow adds | 1.6 |
| Degassing Agent | 0.7 |
| Pigment Package | 8.80 |
| Other Additives | 1.2 |

TABLE 12

| Example # | Composition | Flop Index | Sparkle Grade at 15 |
|---|---|---|---|
| Comparative Example 47 | Grey hybrid powder composition | 0.22 | 0.00 |
| 48 | 50:50 wt % Grey hybrid powder composition and PCC 10103 | 0.47 | 4.05 |

The hybrid formula alone (formed by reacting an acid functional polyester with a polymeric epoxy) did not show any significant sparkle. However, when blended with the clear acrylic a sparkle effect was observed.

What is claimed is:

1. A coated article comprising:

A) a substrate; and

B) a coating layer applied to a surface of the substrate, the coating layer formed from a powder coating composition comprising a dry blend of:

i) a first component comprising an acid or hydroxyl functional polyester resin;

ii) a second component comprising one of an acid or epoxy functional acrylic resin and a polymeric epoxy resin;

wherein the acid or hydroxyl functional polyester resin is present in the powder coating composition in an amount from 10 wt. % to 95 wt. % and the acid or epoxy functional acrylic resin is present in the powder coating composition in an amount from 5 wt. % to 90 wt. %, based on a combined weight of the acid or hydroxyl functional polyester resin and the acid or epoxy functional acrylic resin;

iii) a crosslinker selected from triglycidyl isocyanurate (TGIC), β-hydroxyalkyl amide (HAA), 12-dodecane dioic acid (DDDA) and combinations thereof; and iv) either:

a) one or more colorants, present in only one of the first and second components; or b) a colorant of the same hue as defined by ASTM E284 present in each of the first and second components;

wherein the powder coating composition comprises less than 0.2 wt. % of any effect pigments, based on total weight of the powder coating composition; and wherein after the coating layer is cured on the substrate, the coated article demonstrates a sparkle grade value of at least 4, measured using an imaging multi angle spectrophotometer with a 15° illumination angle relative to the normal of a surface of the coated article.

2. The coated article of claim 1, wherein the coating layer demonstrates a flop index of at least 2.

3. The coated article of claim 1, wherein the powder coating composition comprises less than 0.5 wt. % of any of:

cellulose acetate butyrate;

a component having a melting point greater than a cure temperature of the coating, comprising any of:

fluorine-containing polymers;

pre-cross-linked acrylic copolymer;

polyethylene;

polypropylene;

polyphenylene sulfide;

polyether ether ketone;

polyvinyl chloride;

ionomers;

polyamides; and copolymers of the foregoing;

wax; and silicone-containing polymers.

4. The coated article of claim 1, wherein the powder coating composition comprises less than 0.5 wt. % of any components having a melt temperature greater than 210° C. as determined by differential scanning calorimetry (DSC) according to ASTM D3418-21.

5. The coated article of claim 1, wherein the crosslinker comprises triglycidyl isocyanurate (TGIC).

6. The coated article of claim 1, wherein the crosslinker comprises β-hydroxyalkyl amide (HAA).

7. The coated article of claim 1, wherein the crosslinker comprises 12-dodecane dioic acid (DDDA)).

8. The coated article of claim 1, wherein the powder coating composition is free of any effect pigments.

* * * * *